(12) United States Patent
Naderi et al.

(10) Patent No.: US 7,676,622 B2
(45) Date of Patent: Mar. 9, 2010

(54) SYSTEM AND METHOD FOR IMPROVED BUS COMMUNICATION

(75) Inventors: Kaveh Naderi, Austin, TX (US); Patrick Allen Buckland, Austin, TX (US); Jason Eric Moore, Austin, TX (US); Abel Enrique Zuzuarregui, Paige, TX (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 11/759,365

(22) Filed: Jun. 7, 2007

(65) Prior Publication Data

US 2008/0307148 A1    Dec. 11, 2008

(51) Int. Cl.
*G06F 13/00* (2006.01)
*H05K 7/10* (2006.01)
*G06F 13/14* (2006.01)
*G06F 1/26* (2006.01)
*G06F 1/32* (2006.01)

(52) U.S. Cl. .................. 710/305; 710/300; 710/302; 710/306; 713/310

(58) Field of Classification Search .............. 710/300, 710/302, 306; 713/310
See application file for complete search history.

(56) References Cited

U.S. PATENT DOCUMENTS

| | | | |
|---|---|---|---|
| 6,092,138 A * | 7/2000 | Schutte | 710/113 |
| 6,199,130 B1 * | 3/2001 | Berglund et al. | 710/302 |
| 6,351,819 B1 * | 2/2002 | Berglund et al. | 713/310 |
| 7,034,569 B1 * | 4/2006 | Balasubramanian et al. | 326/38 |
| 7,107,414 B2 * | 9/2006 | Hidai et al. | 711/154 |
| 7,398,345 B2 * | 7/2008 | Larson et al. | 710/306 |
| 7,526,589 B2 * | 4/2009 | Cagno et al. | 710/110 |
| 2004/0177195 A1 * | 9/2004 | Buckland et al. | 710/300 |
| 2006/0149881 A1 * | 7/2006 | Clayton et al. | 710/302 |
| 2008/0307154 A1 * | 12/2008 | Naderi et al. | 711/103 |

OTHER PUBLICATIONS

Working Draft—"Information technology—SCSI Enclosure Services—2 (SES-2)", Dated Jul. 22, 2004; 91 pages.*
Microchip 24C01A/02A/04A Datasheet, 1996, Microchip Technology, Inc.
Microchip 24C32 Datasheet, 2004, Microchip Technology, Inc.
Microchip 24LC41A Datasheet, 2003, Microchip Technology, Inc.

* cited by examiner

*Primary Examiner*—Mark Rinehart
*Assistant Examiner*—Brian T Misiura
(74) *Attorney, Agent, or Firm*—Matthew B. Talpis; Patrick E. Caldwell

(57) ABSTRACT

A system for bus communication includes a first port coupled to a bus, comprising a first engine configured to respond to bus signals on the bus, according to a predetermined protocol. A second port couples to the bus, comprising a second engine configured to respond to bus signals according to the predetermined protocol. A control module couples to the second port and is configured to receive a port state signal, and to disable the second port based on the received port state signal.

13 Claims, 2 Drawing Sheets

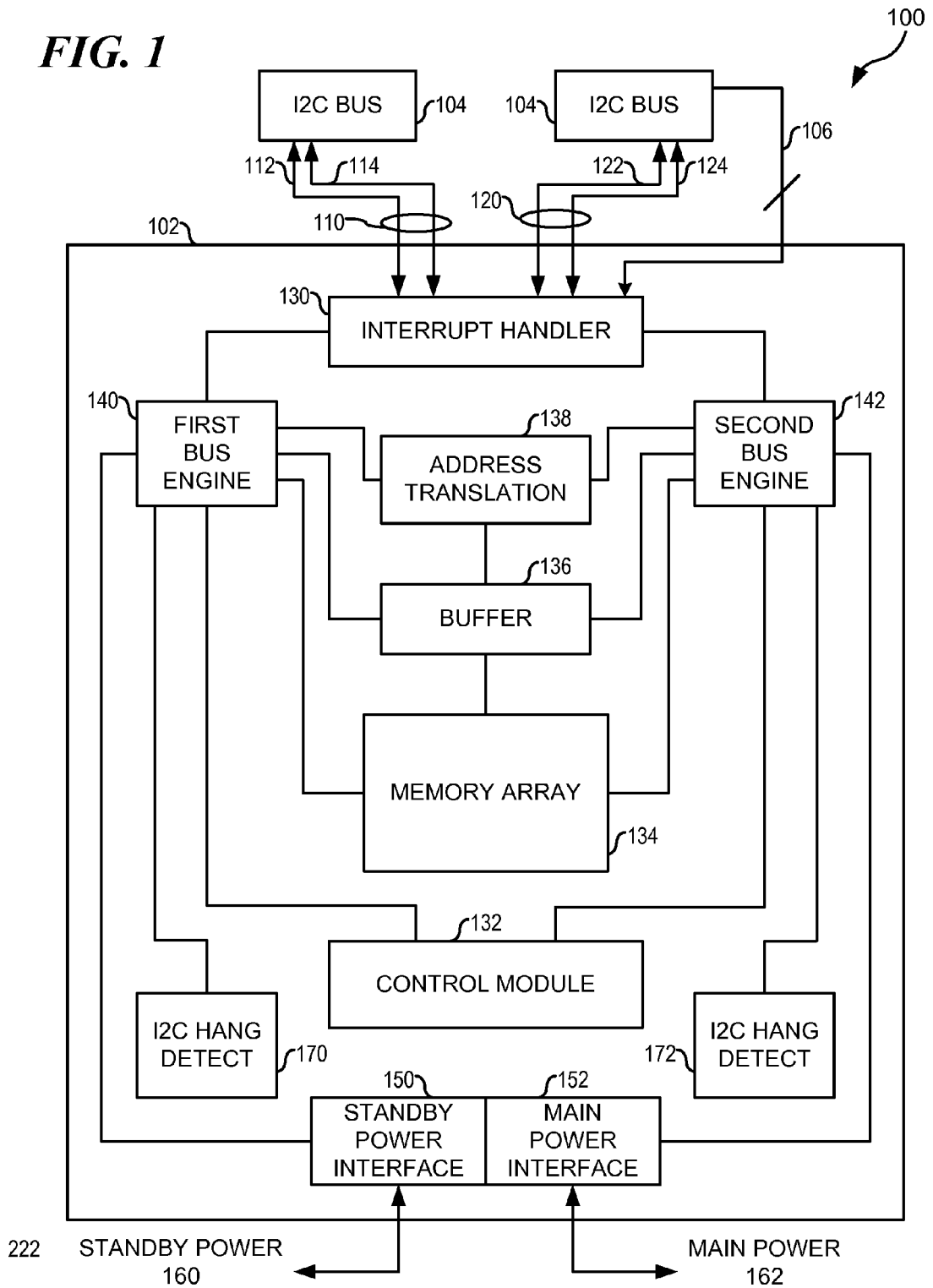

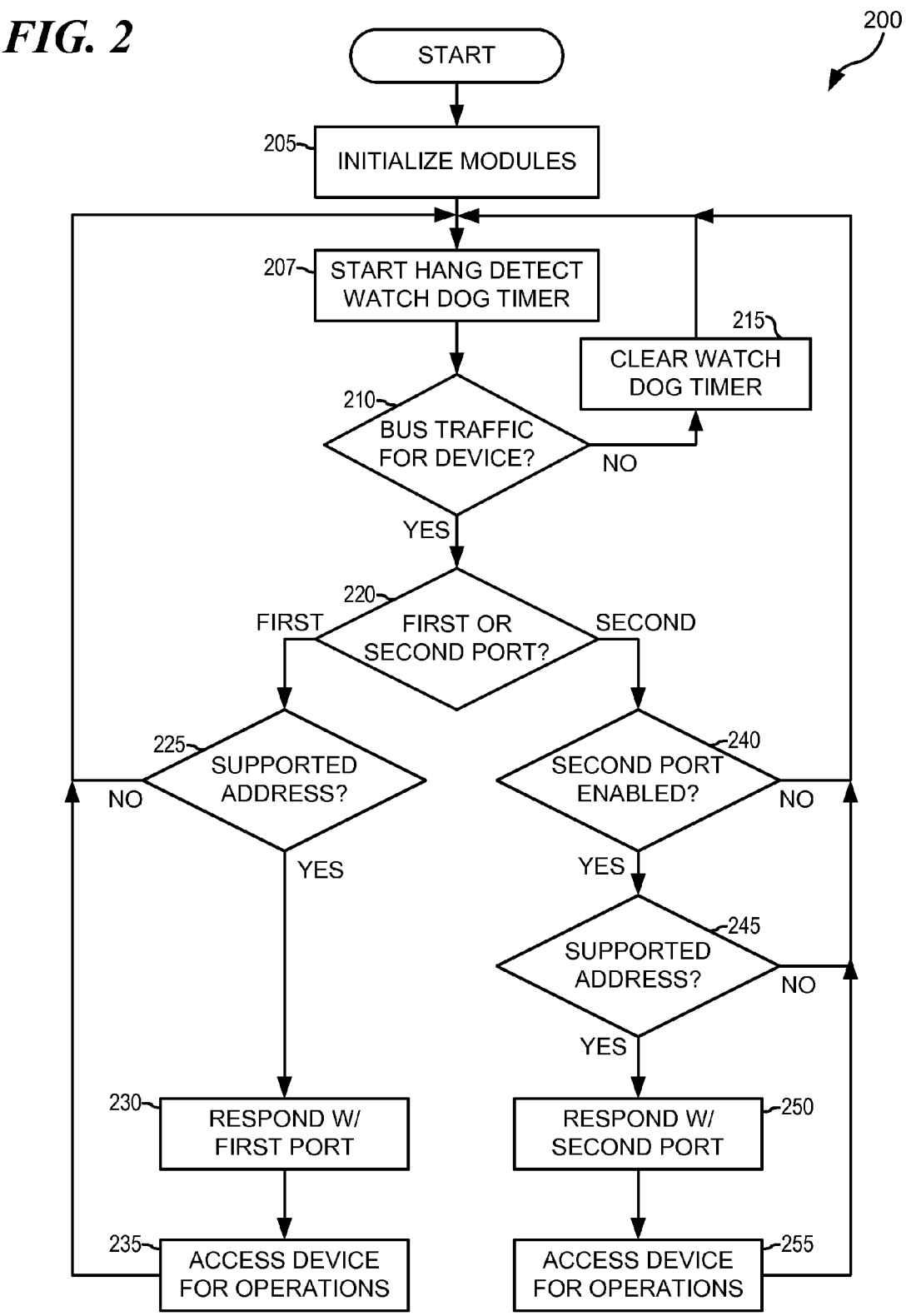

SYSTEM AND METHOD FOR IMPROVED BUS COMMUNICATION

TECHNICAL FIELD

The present invention relates generally to the field of attached computer devices and, more particularly, to a system and method for improved virtual SCSI enclosure services (VSES).

BACKGROUND OF THE INVENTION

Modern electronic devices, such as computers, often attach peripheral devices to a primary or main computing system in a standardized protocol. For example, many computing systems couple peripheral devices, such as hard disk drives, to the system using the well-known Small Computer System Interface (SCSI) protocol.

In some systems, an enclosure houses one or more peripheral devices in a protective case or rack that often includes intelligent services. For example, some enclosures can operate to monitor temperature, cooling, power, component identification, and other useful device characteristics. SCSI Enclosure Services (SES) is one protocol that supports tracking these non-data characteristics of peripheral devices.

In some SES systems, called "virtual SES" (VSES) systems, a firmware or software engine replaces SES functionality that in non-virtual SES systems typically resides on a physical adapter in either the SES backplane or the host system SCSI adapter. Some VSES systems employ the well-known I2C (Inter IC) protocol to communicate between the virtual SES engine and the SES backplane. Generally, I2C permits multiple bus masters on a single bus. I²C is a trademark of Philips Corp.

In certain VSES designs, the VSES system includes two I2C ports, each of which is enabled or disabled based on certain dynamic system states. This dynamic power up/power down timing frequently causes the I2C ports to stall or "hang up," a costly and difficult to predict failure condition. Some attempted solutions exist, but the current solutions offered to address this problem suffer from disadvantages.

For example, one solution couples one I2C port to a standby power domain and another I2C port to a main power domain. This approach, however, typically requires two separate I2C modules with distinct I2C engines, as current I2C chips do not support multiple power domain operation. Adding an additional I2C chip increases costs and reduces the circuit board space available to other system components.

Therefore, there is a need for a system and/or method for bus communications, particularly, virtual SES bus communications, that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

It is, therefore, one aspect of the present invention to provide for an improved SCSI enclosure system.

It is a further aspect of the present invention to provide for an improved virtual SES device.

It is a further aspect of the present invention to provide for an improved virtual SES method.

It is a further aspect of the present invention to provide for an improved bus communication method.

It is a further aspect of the present invention to provide for an improved bus communication system.

The aforementioned aspects and other objectives and advantages can now be achieved as described herein. A system for bus communication includes a first port coupled to a bus, comprising a first engine configured to respond to bus signals on the bus, according to a predetermined protocol. A second port couples to the bus, comprising a second engine configured to respond to bus signals according to the predetermined protocol. A control module couples to the second port and is configured to receive a port state signal, and to disable the second port based on the received port state signal.

In an alternate embodiment, a method for improved bus communications includes monitoring a bus, by a device coupled to the bus and comprising a first port and a second port, for bus traffic directed to the device. The device receives bus traffic directed to the device. In the event the received bus traffic is directed to the second port, the device receives a port state signal. In the event the received port state signal is a disable signal, the device disables the second port. In the event the received port state signal is an enable signal, the device processes the received bus traffic in accordance with a predetermined bus protocol.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 1 illustrates a block diagram showing an improved bus communication device in accordance with a preferred embodiment; and FIG. 2 illustrates a high-level flow diagram depicting logical operational steps of an improved bus communication method, which can be implemented in accordance with a preferred embodiment.

DETAILED DESCRIPTION

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus or otherwise tangible medium that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

FIG. 1 is a block diagram illustrating certain components of an improved bus communications system 100, in accordance with a preferred embodiment of the present invention. In particular, system 100 includes a bus device 102 coupled to a bus 104.

Bus device 102 is a specially configured bus device, described in more detail below. In one embodiment, bus 104 is an otherwise conventional I2C bus. In a preferred embodiment, bus device 102 is a virtual SES adapter and bus 104 is an I2C bus. Bus device 102 couples to bus 104 through a first port "A" 110 and a second port "B" 120. Bus device 102 also couples to bus 104 through a support signal connection 106.

Generally, first port 110 and second port 120 are otherwise conventional bus connections. In a preferred embodiment, first port 110 and second port 120 are otherwise conventional I2C bus connections, each comprising a data line and a clock line. Specifically, in one embodiment, first port 110 includes serial data line (SDA) 112 and serial clock line (SCL) 114. Similarly, second port 120 includes SDA 122 and SCL 124.

Bus device 102 receives support signals from bus 104 through support signal connection 106. In one embodiment, support signals include custom address signals A0, A1, and A2, as one skilled in the art will understand, and a high/low signal, described in more detail below. In an alternate embodiment, support signals include virtual SES support signals.

In a preferred embodiment, support signals include a port state signal. Specifically, in one embodiment, a port state signal indicates to a bus device whether to engage an additional port or bus engine, described in more detail below. In one embodiment, the port state signal comprises an enable signal or a disable signal, indicating whether a second port is enabled or disabled, respectively. In one embodiment, the port state signal is communicated via an I2C #2 enable pin.

In the illustrated embodiment, bus device 102 includes a distinct, discrete pair of wires for each of port 110 and port 120. Additionally, support signal connection 106 can also comprise a plurality of signal lines. Moreover, one skilled in the art will understand that in some embodiments, first port 110, second port 120, and support signal connection 106 can be distributed across a variety of pins of a chip or adapter configured to mount to a system board or other device. Accordingly, for ease of illustration and discussion, bus device 102 is depicted with discrete ports 110, 120, and a composite support signal line 106. One skilled in the art will therefore understand that certain features of the disclosed embodiments can be implemented in a variety of particular wiring configurations.

Bus device 102 includes interrupt handler 130. Generally, interrupt handler 130 is configured to monitor first port 110, second port 120, and support signal connection 106 for bus traffic addressed to bus device 102. As such, in one embodiment, interrupt handler 130 is generally configured as a bus interface for bus device 102.

Moreover, in the illustrated embodiment, the wires, interface, and bus engine, together comprise a "port." In the illustrated embodiment, first port 110 and second port 120 share a common interface, interrupt handler 130. In an alternate embodiment, each of first port 110 and second port 120 comprise a separate interface.

In operation, interrupt handler 130 directs observed bus transactions addressed to bus device 102 to either a first bus engine 140 or a second bus engine 142. In a preferred embodiment, first bus engine 140 and second bus engine 142 are I2C bus engines. Generally, first bus engine 140 and second bus engine 142, described in more detail below, couple to a number of other components of bus device 102.

In particular, first bus engine 140 and second bus engine 142 couple to a control module 132. Control module 132 is an otherwise conventional control module, and is generally configured to provide command and control signals to various components of memory device 102. In particular, in a preferred embodiment, control module 132 receives a port state signal (through interrupt handler 130), and enables or disables second bus engine 142 based on the received port state signal. In one embodiment, control module 132 is a software switch and second bus engine 142 is a hardware I2C engine.

In the illustrated embodiment, first bus engine 140 and second bus engine 142 also couple to a memory array 134. Memory array 134 is an otherwise conventional memory array, modified as described below. First bus engine 140 and second bus engine 142 also couple to a buffer 136. Buffer 136 is an otherwise conventional memory buffer, modified as described below.

First bus engine 140 and second bus engine 142 also couple to an address translation table 138. Address translation table 138 is an otherwise conventional address translation table, modified as described below, and can be implemented in either hardware or software. First bus engine 140 and second bus engine 142 also couple to power interfaces.

In particular, first bus engine 140 couples to standby power interface 150. Standby power interface 150 is an otherwise conventional power interface, and couples to an external system standby power domain 160. Second bus engine 142 couples to main power interface 152. Main power interface 152 is an otherwise conventional power interface, and couples to an external system main power domain 162.

Generally, the bus engines 140 and 142 serve to interpret interrupts (i.e., bus traffic) received from interrupt handler 130 to conduct certain operations, based on the particular type of bus device. For example, in one embodiment, bus device 102 is an I2C memory device, and the operations comprise memory operations on memory array 134, in accordance with the I2C protocol. As used herein, memory operations include read, write, erase, and other operations typical in flash memory or general programmable ROM memories.

In operation, very broadly, interrupt handler 130 monitors first port 110, second port 120, and support signal connection 106 for bus transactions addressed to bus device 102, which are configured as interrupts in one embodiment. Interrupt handler 130 directs bus transactions received through first port 110 to first bus engine 140. Interrupt handler 130 directs bus transactions received through second port 120 to second bus engine 142. As described in more detail below, in one embodiment, each of bus engines 140 and 142 interfaces with the bus (through interrupt handler 130) in a particular configuration.

Specifically, in one embodiment, first bus engine 140 emulates a 512-byte flash memory and second bus engine 142 emulates two 256-byte flash memories. In a preferred embodiment, bus device 102 emulates a 24C32 chip and a 24C04 chip, both as manufactured by Microchip Technology, Inc. In one embodiment, bus device 102 implements first bus engine 140 in hardware and implements second bus engine 142 in software.

In one embodiment, bus device 102 can be a programmable system-on-chip (PSoC). In a preferred embodiment, bus device 102 is a PSoC, such as, for example, a PSoC as manufactured by Cypress, Inc., and is programmed to perform the functions described herein. In an alternate embodiment, bus device 102 can be an otherwise programmable logic and memory device, configured as described herein.

In the illustrated embodiment, bus device 102 includes two physical ports, or bus connections, each comprising a pair of wires. In an alternate embodiment, bus device 102 includes a single physical port, such as, for example, first port 110, and support signal connection 106. So configured, interrupt handler 130 can identify to which of first bus engine 140 and second bus engine 142 to direct a particular bus transaction, based on the signals received (or, in one embodiment, the state of the pins) at first port 110 and support signal connection 106.

In the illustrated embodiment, bus device 102 includes a single memory array 134. In an alternate embodiment, bus device 102 includes a plurality of memory arrays 134. So configured, in one embodiment, each bus engine couples to a dedicated memory array 134. In an alternate embodiment, each bus engine couples to each memory array 134, and interfaces with each memory array 134 in a similar manner. For example, a first bus engine interfaces with each memory array as a single 512 byte flash memory, while a second bus engine interfaces with each memory array as a pair of 256 byte flash memories.

In the illustrated embodiment, the first bus engine 140 couples to a standby power domain and the second bus engine 142 couples to a main power domain. In an alternate embodiment, the second bus engine 142 instead couples to the standby power domain.

In the illustrated embodiment, system 100 also includes bus hang detection modules. Specifically, first bus engine 140 couples to I2C hang detection module 170 and second bus engine 142 couples to I2C hang detection module 172. Generally, each of I2C hang detection modules 170 and 172 are otherwise conventional logic configured to identify hang conditions on the bus, as described in more detail below.

Generally, a hang condition is an error or fault condition wherein the bus is temporarily, and erroneously, locked into a particular state. In some embodiments, a bus reset corrects the hang condition and restores the bus to normal operations. In other embodiments, a system reset corrects the hang condition and restores the bus to normal operations.

In one embodiment, each of I2C hang detection modules 170 and 172 is a timer. In one embodiment, the bus engine resets the I2C hang detection module timer after each observed bus transaction, and checks the I2C hang detection module timer to determine whether a sufficient period of time without bus traffic has elapsed so as to indicate a bus hang condition. As such, in one embodiment, a three-second interval between bus traffic transmissions indicates a bus hang condition.

In one embodiment, one or both of first bus engine 140 and second bus engine 142 is configured to reset the bus in response to a bus hang condition. In an alternate embodiment, one or both of first bus engine 140 and second bus engine 142 is configured to notify a system and/or bus master of the bus hang condition. Accordingly, each of I2C hang detect module 170 and 172 supports a "watch dog" hang detection function.

In the illustrated embodiment, system 100 includes two hang detection modules, I2C hang detect modules 170 and 172. In an alternate embodiment, first bus engine 140 and second bus engine 142 couple to a single I2C hang detect module, configured with separate timers for each bus of system 100. In an alternate embodiment, first bus engine 140 and second bus engine 142 couple to a single I2C hang detect module, configured with a single timer.

As described in more detail below, the present invention provides numerous technical advantages. First, generally, a single module (e.g., bus device 102) can emulate a single flash memory device that includes two separate bus (or I2C) engines that can communicate to two independent I2C masters. In one embodiment, the module and one of the I2C engines operate on standby power and support 16-bit addressing to what appears as a single 512 byte flash memory array. The other I2C engine runs on main power and supports 8-bit addressing to what appears as two distinct 256 byte flash memory arrays.

So configured, the device functions as a dual-port I2C flash module. Accordingly, the system does not require additional conflict detection and arbitration functionality. Additionally, both I2C bus masters can operate independently of each other. One skilled in the art will understand that while both I2C masters cannot access the memory array at the same physical time (in which case one master will receive bus access and one master will be held off), the I2C protocol addresses this conflict by allowing the I2C bus to be stalled in a manner transparent to the bus masters. One such mechanism, for example, is clock stretching, defined in the I2C specification.

One skilled in the art will understand that writing to a flash module generally requires that a whole block be updated during each write. As such, in one embodiment, buffer 136 is a 32-byte EEPROM buffer (EEpromBuffer[ ]). So configured, a flash update can complete within approximately 10-15 milliseconds, which is within the delay of 20 milliseconds between writes that is currently implemented by the SCSI enclosure Services (SES) system. Accordingly, bus device 102 can serve as a virtual SES adapter.

Additionally, as illustrated, bus device 102 supports coupling the bus engines to two different power supply domains. As illustrated, first bus engine 140 couples to a standby power domain 160 and second bus engine 142 couples to a main power domain 162. Thus, bus device 102 provides a dual bus engine configuration that overcomes disadvantages of other systems. More particularly, the dual bus engine configuration shown in the disclosed embodiments does not require an additional chip, such as an I2C chip for example, to implement the second bus engine.

Furthermore, the illustrated embodiments also provide beneficial self correction in the form of bus hang detection. As described above, the bus engines, together with a hang detect watch dog timer, support bus reset in response to a bus hang condition. Either the bus engines themselves, or other suitable module, such as the bus and/or system master, for example, resets the bus in response to a bus hang condition, identified in one embodiment by a predetermined elapsed time between bus traffic transmissions.

FIG. 2 illustrates one embodiment of a method for bus communications. Specifically, FIG. 2 illustrates a high-level flow chart 200 that depicts logical operational steps performed by, for example, system 100 of FIG. 1, which may be implemented in accordance with a preferred embodiment. Generally, one more components of bus device 102 perform the steps of the method, such as control module 132, for example, unless indicated otherwise.

As indicated at block 205, the process begins, wherein bus device 102 initializes various modules and components within bus device 102. Generally, this step can include a predetermined power-on-reset cycle, custom initialization commands, and/or other suitable operations. In one embodiment, this step includes checking and enabling a first bus engine and checking and disabling a second bus engine.

Next, as indicated at block 207, bus device 102 starts a hang detect watch dog timer. As described above, in one embodiment, an elapsed time of three seconds between bus traffic transmissions indicates a high probability of a bus hang condition, for which corrective action should be taken. On subsequent passes, bus device 102 resets and starts the hang detect watch dog timer.

Next, as indicated at decisional block 210, the bus device monitors the bus for traffic addressed to the bus device. If at block 210 there is no bus traffic addressed to the bus device, the process continues along the NO branch to block 215, wherein the bus device resets the hang detect watch dog timer, returning to block 207.

If at block 210 there is bus traffic addressed to the bus device, as, for example, in the form of an interrupt, the process continues along the YES branch to decisional block 220. As indicated at block 220, the bus device determines whether the bus traffic is addressed to the first port or the second port.

If at decision block 220 the bus device determines that the bus traffic is addressed to the first port, the process continues along the first port (FIRST) branch to decisional block 225. As indicated at block 225, the bus device determines whether the bus traffic is directed to a supported address. If at block 225 the bus traffic is not directed to a supported address, the process continues along the NO branch, returning to block 207. If at block 225 the bus traffic is directed to a supported address, the process continues along the YES branch to block 230.

Next, as indicated at block 230, the bus device responds to the bus traffic with the first port engine. In the illustrated embodiment of FIG. 1, first bus engine 240, for example, is the first port engine. In one embodiment, responding to the bus traffic includes sending an acknowledge signal in accordance with the I2C protocol. Next, as indicated at block 235, the bus device accesses the device for operations in accordance with the received bus traffic. In one embodiment, the bus device accesses the memory array for read/write or other memory operations, in accordance with the bus traffic, and the process returns to block 207.

If at decisional block 220 the bus device determines that the bus traffic is addressed to the second port, the process continues along the "second port" (SECOND) branch to decisional block 240. As indicated at block 240, the bus device determines whether the second port is enabled. As described above, in one embodiment, the control module receives a port state signal, comprising either an enable signal or a disable signal. In an alternate embodiment, the bus device samples a connection pin to determine whether the second port is enabled.

If at decisional block 240 the bus device determines that the second port is not enabled, the process continues along the NO branch, returning to block 207. If at decisional block 240 the bus device determines that the second port is enabled, the process continues along the YES branch to decisional block 245.

As indicated at block 245, the bus device determines whether the bus traffic is directed to a supported address. If at block 245 the bus traffic is not directed to a supported address, the process continues along the NO branch, returning to block 207. If at block 245 the bus traffic is directed to a supported address, the process continues along the YES branch to block 250.

Next, as indicated at block 250, the bus device responds to the bus traffic with the second port engine. In the illustrated embodiment of FIG. 1, second bus engine 142, for example, is the second port engine. In one embodiment, second bus engine 142 is a hardware I2C engine. In one embodiment, responding to the bus traffic includes sending an acknowledge signal in accordance with the I2C protocol. Next, as indicated at block 255, the bus device accesses the device for operations in accordance with the received bus traffic. In one embodiment, the bus device accesses the memory array for read/write or other memory operations, in accordance with the bus traffic, and the process returns to block 207.

So configured, the bus device generally monitors the bus to which it is coupled for bus traffic addressed to one of its two ports. The bus device processes bus traffic addressed to a supported address of the first port. The bus device determines whether the second port is enabled before responding to bus traffic addressed to the second port. In one embodiment, the second port is enabled or disabled based on the status of the system in which it is implemented. As described above, the particular embodiments that implement the steps of the method described herein provide numerous technical advantages.

Specifically, embodiments of the present invention provide virtual SES dual ported I2C flash devices that overcome disadvantages of prior art systems and methods. Embodiments of the present invention account for multiple power domain configurations, without also introducing complicated and/or costly additional hardware.

Additionally, embodiments of the present invention provided VSES services in accordance with the VSES and I2C protocols, without introducing excessive increased power consumption. Further, certain embodiments disclosed herein reduce power consumption by disabling the second bus port when it is not needed. The embodiments disclosed herein also reduce board space and reduce I2C bus lock ups caused by power up/power down timing between two I2C engines. Other advantages are readily apparent to one skilled in the art.

It will be appreciated that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A system for bus communication, comprising:
    a first port coupled to a first bus, comprising a first Inter-Integrated Circuit (I2C) engine configured to respond to bus signals on the first bus;
    a second port coupled to the first bus, comprising a second Inter-Integrated Circuit (I2C) engine configured to respond to bus signals on the first bus;
    a control module coupled to the second port and configured to receive a port enable signal, the control module comprising a software switch configured to disable the second port based on the received port enable signal;
    a memory coupled to the first port and the second port;
    wherein the first I2C engine emulates a first memory configuration; and
    wherein the second I2C engine emulates a second memory configuration; and
    wherein the first I2C engine couples to a first power domain and the second I2C engine couples to a second power domain.

2. The system of claim 1, wherein the system is further configured as a Virtual Small Computer System Interface (SCSI) Enclosure Services (VSES) system.

3. The system of claim 1, wherein the control module further comprises a hang detection module.

4. The system of claim 1, wherein the second I2C engine comprises a hardware I2C engine.

5. A method for improved bus communications, comprising:
    monitoring a bus, by a device coupled to the bus, the device comprising a first port, a second port, and a memory, for bus traffic directed to the device;
    wherein the first port comprises a first Inter-Integrated Circuit (I2C) engine configured to respond to bus signals;
    wherein the second port comprises a second Inter-Integrated Circuit (I2C) engine configured to respond to bus signals;
    wherein the first I2C engine emulates a first memory configuration;
    wherein the second I2C engine emulates a second memory configuration; and
    wherein the first I2C engine couples to a first power domain and the second I2C engine couples to a second power domain;
    receiving, by the device, bus traffic directed to the device;
    in the event the received bus traffic is directed to the first port, accessing, by the first I2C engine, the first memory emulation according to the received bus traffic;
    in the event the received bus traffic is directed to the second port, receiving, by the device, a port enable signal;
    in the event the received port enable signal is a disable signal, disabling the second port; and
    in the event the received port enable signal is an enable signal, accessing, by the second I2C engine, the second memory emulation according to the received bus traffic.

6. The method of claim 5, wherein the control module further comprises a hang detection module.

7. The method of claim 5, wherein the bus traffic comprises an interrupt.

8. The method of claim 5, wherein receiving, by the device, a port enable signal comprises monitoring a port enable pin.

9. The method of claim 5, wherein the bus traffic comprises Virtual Small Computer System Interface (SCSI) Enclosure Services (VSES) communications.

10. A processor comprising a computer program product for improved bus communications, the computer program product having a tangible computer-readable medium with a computer program embodied thereon, the computer program comprising:
    computer code for monitoring a bus, by a device coupled to the bus, the device comprising a first port, a second port, and a memory, for bus traffic directed to the device;
    wherein the first port comprises a first Inter-Integrated Circuit (I2C) engine configured to respond to bus signals;
    wherein the second port comprises a second Inter-Integrated Circuit (I2C) engine configured to respond to bus signals;
    wherein the memory comprises a first memory emulation configuration and a second memory emulation configuration;
    wherein the first I2C engine emulates a first memory configuration;
    wherein the second I2C engine emulates a second memory configuration; and
    wherein the first I2C engine couples to a first power domain and the second I2C engine couples to a second power domain;
    computer code for receiving, by the device, bus traffic directed to the device bus;
    computer code for, in the event the received bus traffic is directed to the first port, accessing, by the first I2C engine, the first memory emulation according to the received bus traffic;
    computer code for, in the event the received bus traffic is directed to the second port, receiving, by the device, a port enable signal;
    computer code for, in the event the received port enable signal is a disable signal, disabling the second port; and
    computer code for, in the event the received port enable signal is an enable signal, accessing, by the second I2C engine, the second memory emulation according to the received bus traffic.

11. The processor of claim 10, wherein the control module further comprises a hang detection module.

12. The processor of claim 10, wherein the bus traffic comprises an interrupt.

13. The processor of claim 10, wherein the bus traffic comprises Virtual Small Computer System Interface (SCSI) Enclosure Services (VSES) communications.

* * * * *